Dec. 29, 1931.   R. ABELL   1,838,350
ENGINE DRIVE MECHANISM
Filed July 29, 1929   2 Sheets-Sheet 2
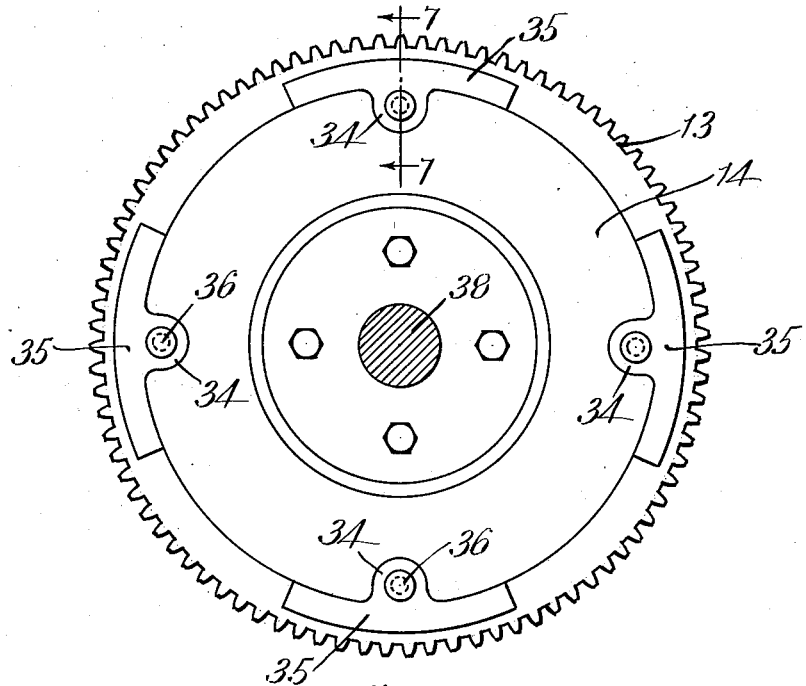
Fig. 6.
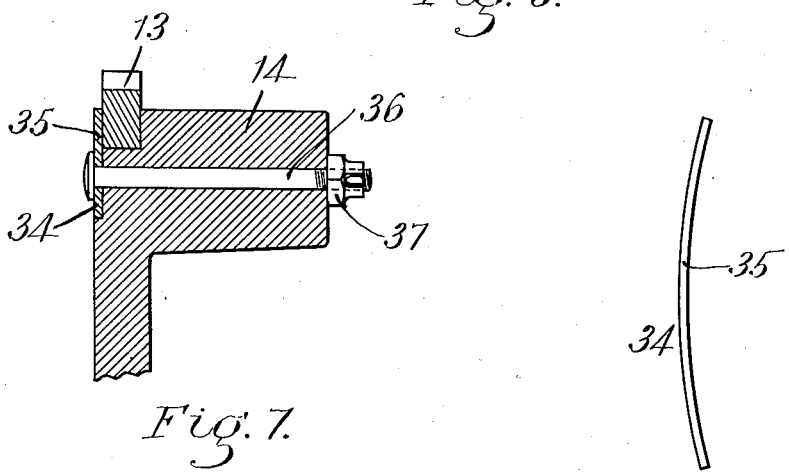
Fig. 7.
Fig. 8.
Inventor:
Rollin Abell.
by Charles J. Gooding,
Atty.

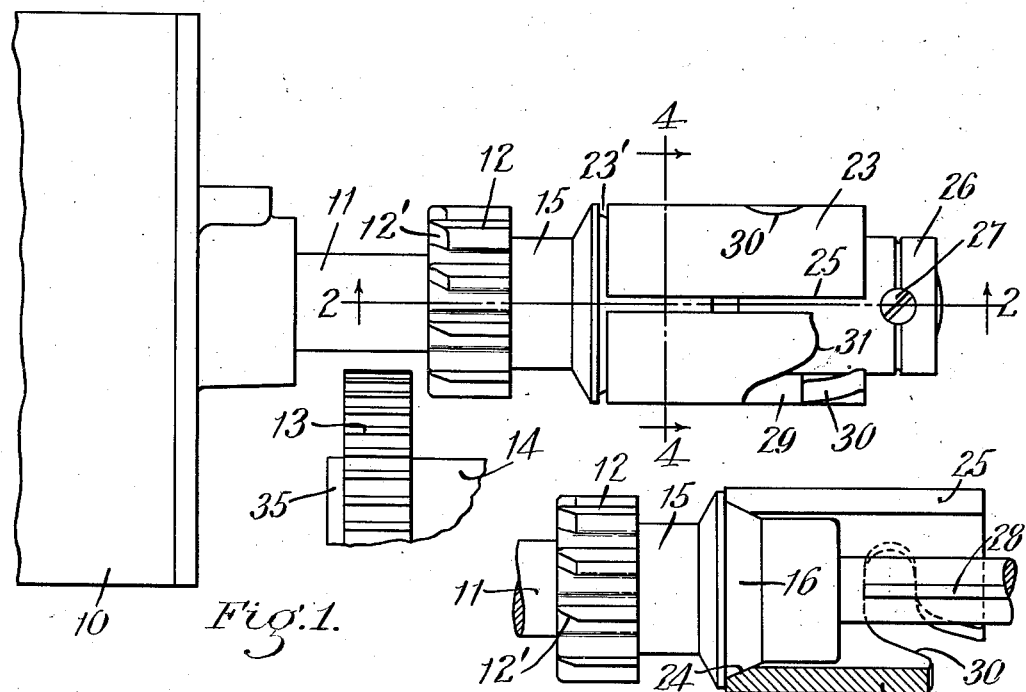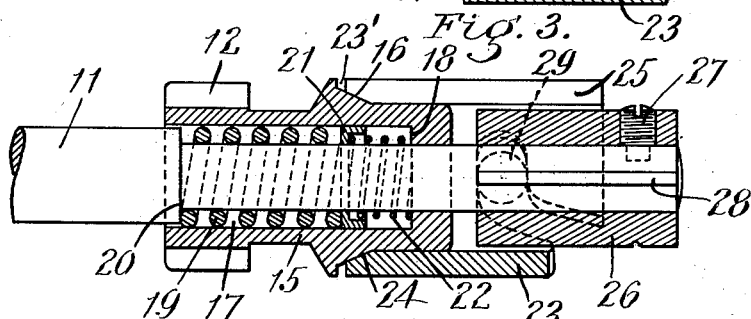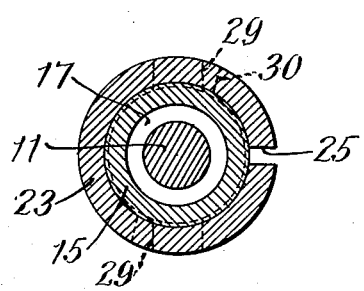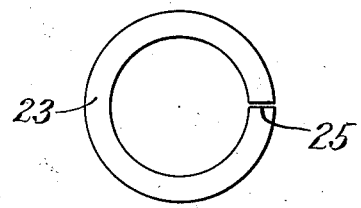

Patented Dec. 29, 1931

1,838,350

UNITED STATES PATENT OFFICE

ROLLIN ABELL, OF MILTON, MASSACHUSETTS

ENGINE DRIVE MECHANISM

Application filed July 29, 1929. Serial No. 381,903.

This invention relates to an engine drive mechanism particularly adapted to transmit motion from a driving shaft to a driven shaft, such, for example, as the driving shaft of a starting motor in an automobile and the fly wheel and crank shaft of an internal combustion engine.

The engine drive mechanism of this invention embodies therein a cylindrical friction clutch comprising a pinion provided with a cylindrical hub and a split cam sleeve mounted on said hub and having frictional engagement therewith of a predetermined amount, that is, in the present embodiment of my invention the cam sleeve will slip on the pinion hub when encountering a resistance to rotation thereof approximately equal to the maximum stall torque of the starting motor. The cam sleeve is also slidable longitudinally thereof on said pinion hub against the same frictional resistance when the teeth of the pinion butt against the teeth of a ring gear, and this slipping prevents chipping the teeth of the gear or of the pinion when the pinion is being moved into engagement with the gear.

The objects of the invention are as follows:—

First:—To increase the life of the pinion and ring gear by preventing the chipping of the teeth of the ring gear or of the pinion during the interengagement of the teeth of the pinion with the teeth of the ring gear, and also to avoid any torque reaction. When the teeth of the pinion butt end to end with the teeth of the ring gear, unless the driving pinion moves in relation to the driven shaft, and the driven gear changes its position in relation to the fly wheel, the edges of the teeth will be damaged.

Second:—The object of the invention is to provide a clutch in the engine drive mechanism which slips when starting the engine, due to overcoming the inertia of the parts to be moved, and Third:—The object of the invention is to provide a clutch which will slip in case of back-fire.

The invention consists in an engine drive mechanism of the character set forth in the following specification and particularly as pointed out in the claims.

The invention further consists of an improved friction clutch and also embodies an annular gear clutched by frictional engagement to the body portion thereof, all as set forth in the claims.

Referring to the drawings:

Figure 1 is a side elevation of a preferred form of my engine drive mechanism, the same being broken away to save space.

Fig. 2 is a longitudinal sectional elevation taken on line 2—2 of Fig. 1.

Fig. 3 is a longitudinal sectional elevation similar to Fig. 2 but illustrating the cam sleeve advanced on the pinion hub to a different position from that illustrated in Fig. 2.

Fig. 4 is a transverse section taken on the line 4—4, Fig. 1.

Fig. 5 is an end elevation of the frictional sleeve prior to its attachment to the hub of the driving pinion.

Fig. 6 is a front elevation of a fly wheel embodying a portion of my invention as to the frictional drive of the driven shaft.

Fig. 7 is a sectional elevation taken on the line 7—7 of Fig. 6.

Fig. 8 is a detail plan of one of the clamp plates utilized in the embodiment of my invention illustrated in Figs. 6 and 7.

Like numerals refer to like parts throughout the several views of the drawings.

In the drawings, referring to Figs. 1 to 5 inclusive, 10 is a portion of a starting motor such as is used in automobiles for starting the rotation of the engine crank shaft and well known to those skilled in this art, and 11 is the starting motor shaft. 12 is a driving pinion which is slidably mounted on the shaft 11 and is operated by the mechanism hereinafter described to be moved longitudinally of the shaft 11 into engagement with an annular gear 13 which is positioned upon a body portion, or fly wheel 14. The pinion 12 has its teeth bevelled at 12' in order to assist in the interengagement of the pinion teeth with the gear teeth, and has a cylindrical hub 15 which is provided with a conical shoulder 16 and with a cylindrical bore 17 which terminates within the hub 15 forming a shoulder 18. Within the bore 17 is positioned a heavy spring 19, one end of which bears against a shoulder 20 on the drive shaft 11, and the other end bears against a sliding collar 21. The sliding collar 21 has another spring 22 lighter than the spring 19 interposed between it and the shoulder 18.

A split cam sleeve 23 is mounted upon the hub 15 and is beveled at 24 to engage the conical shoulder 16. The split cam sleeve 23 is clutched to the hub 15 of the driving pinion 12 by frictional engagement of predetermined capacity. Before being attached to the hub 15, the sleeve 23 appears as illustrated in Fig. 5, that is, it is split at 25 with the two edges of the split sleeve slightly spaced apart as illustrated in said figure. The diameter of the bore of the sleeve 23 before the sleeve is forced onto the hub 15 is smaller than the diameter of said hub and it is manufactured in such a way that the bore of the sleeve is exactly cylindrical. The bore of the hub 15 is also exactly cylindrical and the sleeve 23 is forced onto the hub 15 until the conical end portion 24 thereof abuts against the conical portion 16 of the hub. The sleeve fits the hub 15 tightly enough so that it will not slip or rotate upon the hub 15 under normal conditions encountered in imparting motion to the fly wheel and crank shaft of the engine after the initial starting of the fly wheel and crank shaft has been accomplished, but if in moving the pinion 12 into engagement with the annular gear 13 the teeth of the pinion should butt against the teeth of the annular gear, then the cam sleeve will slip longitudinally upon the hub 15 until the teeth of the pinion are rotated into alignment with the spaces between the teeth of the gear 13, whereupon the teeth of the pinion and the gear will mesh without chipping the same.

Another sleeve 26 is fastened to the extreme outer end of the driving shaft 11 by a set screw 27 and key 28. This sleeve has a pair of studs 29 projecting laterally therefrom on opposite sides thereof and these studs project into cam grooves 30 provided in the rear end of the friction sleeve 23. These studs perform a two-fold function. They move the sleeve 23, together with the hub 15 and its pinion 12, longitudinally of the shaft 11 into engagement with the gear 13 of the fly wheel 14, and also impart a rotary movement to the gear 13, fly wheel 14 and crank shaft to which it is attached, the crank shaft not being shown in the drawings but well known to those skilled in this art.

In Figs. 5 and 6 the annular gear 13 and the fly wheel, or body portion 14 of the gear are illustrated, and it will be seen that the annular gear 13 is clamped to the body portion or fly wheel 14 by a plurality of clamp plates 34. Each of the clamp plates 34 consists of a segmental plate 35 which is clamped to the body portion 14 of the ring gear 13 by a bolt 36 and nut 37. The body portion 14 of the ring gear 13 constitutes preferably the fly wheel of the engine. The segmental plate 35 is of spring metal and prior to its attachment to the fly wheel 14, it is arcuate in form as illustrated in Fig. 8.

When attached to the fly wheel 14 by the bolt 36 and nut 37 the clamp plates 35 bear against the ring gear 13 and clutch it to the rim of the fly wheel 14, but with a frictional engagement of predetermined capacity approximately equal to the stall torque of the starting motor so that when the fly wheel is started by the pinion 12, or if any abnormal resistance to the rotation of the fly wheel or the crank shaft 38 to which it is attached should occur, the annular, or ring gear 13 will slip on the fly wheel, or body portion 14.

The general operation of the mechanism hereinbefore specifically, and to some extent in general described, is as follows:—Assuming the starter mechanism to be operated in the usual manner, the starter shaft or drive shaft 11 is rotated. This imparts rotation to the sleeve 26 with its laterally projecting studs 29. The studs engage the edge 31 of the cam 30 and drive the sleeve 23, hub 15 and pinion 12 longitudinally of the shaft 11 and into engagement with the annular gear 13, and the said studs also impart a rotary move- to the pinion 12 and gear 13 by engaging the edge 25 of the sleeve 23. When the pinion 12 engages the annular gear 13 if the teeth of the pinion and gear abut, the cam sleeve will slide longitudinally on the hub 15 of the pinion 12 from the position illustrated in Fig. 2 to the position illustrated in Fig. 3, thus forcing the teeth of the pinion against the teeth of the gear with a yielding pressure, due to the frictional engagement of the cam sleeve 23 with the hub 15 of the pinion 12, and this will prevent chipping of the teeth of the pinion or of the gear. On a slight rotation of the pinion relatively to the gear, the teeth of the pinion will be brought into alignment with the spaces between the teeth of the gear, and the teeth of the pinion will then be forced into interengagement with the teeth of the annular gear in the proper position to rotate the same.

The principal object of the annular gear 13 being mounted with frictional engagement of predetermined amount upon the body portion thereof or fly wheel 14 is to present a new point of engagement to the pinion teeth with the gear teeth at each time that the pinion gear is moved into engagement with the annular gear. On a four cylinder engine the fly wheel will stop at one of two places 180° apart and it will be seen that if the annular gear has slipped on the fly wheel, the teeth of the pinion upon the next interengagement thereof with the teeth of the gear, will mesh with the different teeth when first forced into engagement with the annular gear than it did on the previous movement of the pinion into engagement with the gear so that equal wear is brought to bear eventually upon all the teeth of the pinion and of the gear.

It will be seen that when the teeth of the pinion 12 butt against the teeth of the gear 13 and meet head on, the space 23' between the cam sleeve and the hub of the pinion will allow endwise or axial movement of the sleeve 23 upon the hub 15, while at the same time the sleeve is slipping or rotating upon the hub, and thus the teeth of the pinion will be brought into mesh with the teeth of the annular gear 13 without chipping the teeth of either of said parts. As soon as the teeth of the pinion 12 enter the space between the teeth of the annular gear 13, the parts of the friction clutch illustrated in Fig. 3 will return to the normal position illustrated in Fig. 2.

When the gear 13, fly wheel 14 and its crank shaft are rotating, the starter is stopped in the usual manner and the pinion 12 will be moved out of engagement with the gear 13 by the combined action of the springs 19 and 22 which have been compressed when the pinion was thrown into mesh with the gear 13, and also by reason of the fact that the pinion 12 now being rotated by the gear 13, and the studs 29 being stationary, the sleeve and the pinion 12 will be forced toward the right, Fig. 1, by the engagement of the studs 29 with the side 31' of the cam 30. In case of back-fire when the pinion 12 is engaging the annular gear 13, either the annular gear 13 will slip on the body portion 14, or the sleeve 23 will slip on the hub 15 or both. By utilizing friction between the two parts of the friction clutch or between the annular gear and the body portion thereof, there is no reaction between the parts which are frictionally engaged with each other as would be the case if a spring were employed to secure the yielding of one part relatively to another.

In order to accomplish the results and attain the objects hereinbefore set forth it is essential in the engine drive mechanism to have both the slipping of one portion of the clutch on the other and the slipping of the annular gear on its body portion or fly wheel because tooth chipping will occur if there is no slipping between the pinion and the driven shaft and between the gear and fly wheel. It is also necessary that the ring gear slip in relation to the fly wheel so as to present different teeth to the pinion and distribute the wear evenly throughout the entire circumference of the ring gear.

I claim:

1. An engine drive mechanism having, in combination, a driving shaft, a driven member, a driving member slidable longitudinally on said shaft into engagement with said driven member and embodying therein two cylindrical parts, one of said cylindrical parts having a bore and being split longitudinally thereof, the other of said cylindrical parts projecting into said bore, the diameter of the bore being normally less than the outside diameter of the cylindrical part, whereby said parts are clutched together by peripheral frictional engagement with each other, and means actuated by the rotation of said shaft for sliding the driving member along the shaft and into engagement with the driven member.

2. An engine drive mechanism having, in combination, a driving shaft, a driven member, a driving member slidable longitudinally on said shaft into engagement with said driven member and embodying therein two cylindrical parts, one of said cylindrical parts having a bore and being split longitudinally thereof, the other of said cylindrical parts projecting into said bore, the diameter of the bore being normally less than the outside diameter of the cylindrical part, whereby said parts are clutched together by peripheral frictional engagement with each other, and means actuated by the rotation of said shaft for sliding the driving member along the shaft and into engagement with the driven member, the said means being adapted to also rotate said driven member.

3. An engine drive mechanism having, in combination, a driving shaft, a driven member, a driving member slidable longitudinally on said shaft into engagement with said driven member and embodying therein two cylindrical parts, one of said cylindrical parts having a bore and being split longitudinally thereof, the other of said cylindrical parts projecting into said bore, the diameter of the bore being normally less than the outside diameter of the cylindrical part, whereby said parts are clutched together by peripheral frictional engagement of predetermined capacity with each other, and means actuated by the rotation of said shaft for sliding the driving member along the shaft and into engagement with the driven member.

4. An engine drive mechanism having, in combination, a driving shaft, a driven member, a driving member slidable longitudinally on said shaft into engagement with said driven member and embodying therein two cylindrical parts, one of said cylindrical parts having a bore and being split longitudinally thereof, the other of said cylindrical parts projecting into said bore, the diameter of the bore being normally less than the outside diameter of the cylindrical part, whereby said parts are clutched together by peripheral frictional engagement of predetermined capacity with each other, and means actuated by the rotation of said shaft for sliding the driving member along the shaft and into engagement with the driven member, said means being adapted to also rotate said driven member.

5. An engine drive mechanism having, in combination, a driving shaft, a driven member, a driving member slidable longitudinally on said shaft into engagement with said driven member and embodying therein two cylindrical parts, one of said cylindrical parts having a bore and being split longitudinally thereof, the other of said cylindrical parts projecting into said bore, the diameter of the bore being normally less than the outside diameter of the cylindrical part, whereby said parts are clutched together by peripheral frictional engagement with each other, means actuated by the rotation of said shaft for sliding the driving member along the shaft and into engagement with the driven member, and resilient means interposed between said driving member and shaft and tending to move said driving member in the opposite direction.

6. An engine drive mechanism having, in combination, a driving shaft, a driven member embodying a gear, a pinion slidable longitudinally on said shaft into engagement with said gear and embodying therein a hub, a sleeve into which said hub projects, the diameter of the bore of said sleeve being normally less than the outside diameter of said hub, whereby said sleeve and hub are clutched together by peripheral frictional engagement with each other, and means actuated by the rotation of said shaft for sliding said pinion and sleeve longitudinally of said shaft, whereby said pinion may be brought into engagement with the gear.

7. An engine drive mechanism having, in combination, a driving shaft, a driven member embodying a gear, a pinion slidable longitudinally on said shaft into engagement with said gear and embodying therein a hub, a sleeve into which said hub projects, the diameter of the bore of said sleeve being normally less than the outside diameter of said hub, whereby said sleeve and hub are clutched together by peripheral frictional engagement with each other, and means actuated by the rotation of said shaft for sliding said pinion and sleeve longitudinally of said shaft, whereby said pinion may be brought into engagement with the gear, said means being adapted to also rotate said pinion and gear.

8. An engine drive mechanism having, in combination, a driving shaft, a driven member embodying a gear, a pinion slidable longitudinally on said shaft into engagement with said gear and embodying therein a hub, a sleeve into which said hub projects, the diameter of the bore of said sleeve being normally less than the outside diameter of said hub, whereby said sleeve and hub are clutched together by peripheral frictional engagement of predetermined frictional capacity with each other, and means actuated by the rotation of said shaft for sliding said pinion and sleeve longitudinally of the shaft, whereby said pinion may be brought into engagement with the gear.

9. An engine drive mechanism having, in combination, a driving shaft, a driven member embodying a gear, a pinion slidable longitudinally on said shaft into engagement with said gear and embodying therein a hub, a split sleeve surrounding said hub, the diameter of the bore of said sleeve being normally less than the outside diameter of said hub, whereby said sleeve and hub are clutched together by peripheral frictional engagement, and a lateral projection on said shaft engaging a cam on said sleeve, whereby said pinion may be slid along said shaft and into engagement with said gear.

10. An engine drive mechanism having, in combination, a driving shaft, a driven member embodying a gear, a pinion slidable longitudinally on said shaft into engagement with said gear and embodying therein a hub, a split sleeve surrounding said hub, the diameter of the bore of said sleeve being normally less than the outside diameter of said hub, whereby said sleeve and hub are clutched together by peripheral frictional engagement, a lateral projection on said shaft engaging a cam on said sleeve, whereby said pinion may be slid along said shaft and into engagement with said gear, and resilient means interposed between said pinion and said shaft and tending to move said pinion out of engagement with said gear.

11. A friction clutch having, in combination, a shaft, a cylindrical member and a split sleeve rotatable thereon, said cylindrical member projecting into said split sleeve, the diameter of the bore of said sleeve being normally less than the outside diameter of said cylindrical member, whereby the cylindrical member and sleeve are clutched together by frictional engagement of predetermined capacity, and means on said shaft to move said split sleeve longitudinally of said cylindrical member.

12. A friction clutch having, in combination, a shaft, a cylindrical member and a split sleeve slidable thereon, said cylindrical member projecting into said sleeve, the diameter of the bore of said sleeve being normally less than the outside diameter of said cylindrical member, whereby the cylindrical member and sleeve are clutched together by frictional engagement of predetermined capacity, and means on said shaft to move said sleeve longitudinally of said cylindrical member.

13. A friction clutch having, in combination, a shaft, a cylindrical member and a split sleeve slidable and rotatable thereon, the diameter of the bore of said sleeve being normally less than the outside diameter of said cylindrical member which projects thereinto, whereby the cylindrical member and sleeve are clutched together by frictional engagement of predetermined capacity, and means on said shaft to move said split sleeve longitudinally on said cylindrical member.

14. A friction clutch having, in combination, a shaft, a cylindrical member with a conical shoulder on its periphery, and a split sleeve rotatable on said cylindrical member and slidable longitudinally thereof, the diameter of the bore of said sleeve being normally less than the outside diameter of said cylindrical member which projects thereinto, whereby the cylindrical member and sleeve are clutched together by frictional engagement of predetermined capacity, one end of said sleeve being adapted to engage said shoulder, and means on said shaft to move said split sleeve longitudinally on said cylindrical member.

15. A friction clutch having, in combination, a shaft, a cylindrical member with a shoulder on its periphery and a split sleeve rotatable on said cylindrical member and slidable longitudinally thereof, the diameter of the bore of said sleeve being normally less than the outside diameter of said cylindrical member which projects thereinto, whereby the cylindrical member and sleeve are clutched together by frictional engagement of predetermined capacity, one end of said sleeve being adapted to engage said shoulder, and means on said shaft to move said split sleeve longitudinally on said cylindrical member.

16. An engine drive mechanism having, in combination, a driving shaft, a driven member embodying a gear, a pinion slidable longitudinally on said shaft into engagement with said gear and embodying therein a hub with a conical shoulder on its periphery, a sleeve on said hub, the bore of said sleeve adjacent said shoulder being bevelled, said sleeve being clutched to said hub by frictional engagement, and a lateral projection on said shaft engaging a cam on said sleeve whereby said pinion may be slid along said shaft and into engagement with said gear.

In testimony whereof I have hereunto set my hand.

ROLLIN ABELL.